United States Patent
Rouis

(10) Patent No.: US 8,076,895 B2
(45) Date of Patent: Dec. 13, 2011

(54) METHOD AND DEVICE FOR GENERATING SIGNALS FOR CONTROLLING MULTI-PHASED ROTATING ELECTRIC MOTOR

(75) Inventor: Oussama Rouis, Levallois Perret (FR)

(73) Assignee: Valeo Equipment Electriques Moteur, Creteil (FR)

( * ) Notice: Subject to any disclaimer, the term of this patent is extended or adjusted under 35 U.S.C. 154(b) by 642 days.

(21) Appl. No.: 12/280,637

(22) PCT Filed: Apr. 27, 2007

(86) PCT No.: PCT/FR2007/051195
§ 371 (c)(1),
(2), (4) Date: Oct. 29, 2008

(87) PCT Pub. No.: WO2007/138203
PCT Pub. Date: Dec. 6, 2007

(65) Prior Publication Data
US 2009/0167221 A1   Jul. 2, 2009

(30) Foreign Application Priority Data
May 31, 2006   (FR) ..................................... 06 51975

(51) Int. Cl.
*H02P 1/46* (2006.01)
(52) U.S. Cl. ................. 318/721; 318/400.14; 318/400.1
(58) Field of Classification Search .................. 318/560, 318/400.01, 400.13, 400.38, 721, 779, 799, 318/430, 437, 599, 400.1, 400.3, 400.14
See application file for complete search history.

(56) References Cited

U.S. PATENT DOCUMENTS

| 4,353,016 | A  | * | 10/1982 | Born ........................ 318/400.23 |
| 5,264,775 | A  | * | 11/1993 | Namuduri et al. ............ 318/811 |
| 5,847,523 | A  | * | 12/1998 | Rappenecker et al. ....... 318/434 |
| 6,271,641 | B1 | * | 8/2001  | Yasohara et al. .............. 318/685 |
| 6,759,821 | B2 | * | 7/2004  | Gotou ...................... 318/400.13 |
| 6,879,129 | B2 | * | 4/2005  | Tazawa et al. ................ 318/727 |
| 7,259,531 | B1 | * | 8/2007  | Liu .......................... 318/400.38 |
| 7,274,161 | B2 | * | 9/2007  | Mori et al. ................. 318/400.36 |
| 7,402,916 | B2 |   | 7/2008  | Taspinar et al. |
| 2002/0175645 | A1 | | 11/2002 | Fujimoto et al. |

FOREIGN PATENT DOCUMENTS

| FR | 2 854 746 A1 | 11/2004 |
| GB | 2 137 755 A  | 10/1984 |

* cited by examiner

*Primary Examiner* — Paul Ip
*Assistant Examiner* — Antony M Paul
(74) *Attorney, Agent, or Firm* — Berenato & White, LLC

(57) ABSTRACT

A method wherein the signals (SW1, Sw2, Sw3) controlling the power supply (10) of the phase windings (4) of the motor consist of signals (So1, So2, So3) that are out-of-phase by a phase angle (f) which is continuously variable in relation to synchronization signals (Si1, Si2, Si3) generated by sensors (1) detecting the position of the rotor. According to the method, a processing unit (5) comprises inlets (8) for receiving the synchronization signals and outlets (6, 7) for transmitting the out-of-phase signals. The synchronization signals are binary signals presenting synchronization fronts and the rising and falling fronts of the out-of-phase signals are generated, following a level switching time depending at least on the phase angle, from at least one reference front selected from the synchronization fronts such that the switching time is minimum.

22 Claims, 7 Drawing Sheets

METHOD AND DEVICE FOR GENERATING SIGNALS FOR CONTROLLING MULTI-PHASED ROTATING ELECTRIC MOTOR

CROSS-REFERENCE TO RELATED APPLICATIONS AND CLAIM TO PRIORITY

This application relates to International Application No. PCT/FR2007/051195 filed Apr. 27, 2007 and French Patent Application No. 0651975 filed May 31, 2006, of which the disclosures are incorporated herein by reference and to which priority is claimed.

TECHNICAL FIELD OF THE INVENTION

The present invention concerns a method and device for generating control signals for a polyphase rotary electrical machine according to the speed.

These control signal control the supply to the machine so as to procure for the machine power and torque characteristics adapted to the various applications.

TECHNOLOGICAL BACKGROUND TO THE INVENTION

With the widespread use of brushless motors, many methods and devices fulfilling this function are known from the prior art.

More recently, these devices and methods also concern reversible electricity generators, that is to say those functioning both as an alternator and as a starter.

A method of controlling an alternator starter is for example described in the patent application FR2854746 by the company Valeo Equipments Electriques Moteur.

According to this patented method, the synchronisation signals issuing from the sensors determining the angular position of the rotor of the machine are out of phase in order to control the phases of the armature sequentially.

The phase-difference angle of the signals is chosen so as to control the torque according to the speed and to adapt it to the operating mode, in particular either as a starter or as an auxiliary motor.

To do this a microcontroller interfaced with a digital to analogue converter and operational amplifiers effects, in order to generate each out-of-phase signal, a linear combination of the synchronisation signals where the sum of the coefficients is zero.

The optimisation of the alternator starter described in particular in the document FR2854746 led Valeo to implement, on programmable components, in replacement for the system functioning in mixed mode, a fully digital general method that was the object of the conjoint patent application entitled "Method and device for generating out-of-phase signals and use thereof".

The method described in this conjoint application is general in so far as the phase-difference angle of the signals is a variable exogenous to the system rather than a variable acting in the control loop of the machine.

This method will not be described in detail in the present application, the description of the conjoint application being introduced here in its entirety for all useful references.

GENERAL DESCRIPTION OF THE INVENTION

The aim of the present invention is therefore to take advantage of the reduction in transit times and jitter obtained by the general method filled conjointly, in the case of the improvement of the performance of a machine of the alternator starter type.

To do this, the present invention relates to a method of regenerating control signals for a polyphase rotary electrical machine comprising phase windings and sensors for the position of the rotor equal in number to the number of phases.

This method is of the type where the control signals controlling the power supply to the windings consist of signals offset in phase by means of a unit for processing a phase-difference angle continuously variable with respect to synchronisation signals produced by the sensors, this processing signal having inputs receiving the synchronisation signal and outputs transmitting the out-of-phase signals.

The method according to the invention is remarkable in that the synchronisation signals are binary signals having synchronisation edges and in that the rising and falling edges of these out-of-phase signals are generated after a switching delay that is a function at least of this phase-difference angle from at least one reference edge chosen from the synchronisation edges such that the delay is minimum.

According to an additional characteristic of the method, the control signals are highly advantageously identical to the synchronisation signals under specific operating conditions, in particular when the speed of rotation of the machine is less than a first minimum speed, or greater than a first maximum speed.

Preferably, the specific operating conditions of the machine in addition comprise the case where the rotation speed:
  increases and remains below a second minimum speed higher than the first minimum speed;
  decreases and remains higher than a second maximum speed lower than the first maximum speed, the second maximum speed being higher than the second minimum speed.

Advantageously, it will also be considered that the specific operating conditions comprise the case where the processing unit is stopped.

Under these specific operating conditions the processing unit copies the logic levels of the inputs onto the outputs, or alternatively, preferably, the processing unit controls the switching of the control signals onto the inputs.

According to the method of the invention, the synchronisation signals having a duty cycle ratio equal to 0.5 and being out of phase with each other by a nominal phase-difference angle in degrees equal to 360° divided by the number of phases, an interval of time lying between two successive synchronisation edges, one being rising and the other falling, is measured.

Preferably, an inter-edge value of this time interval results from a counting by means of a programmable measuring delay circuit associated with the synchronisation signals having a predetermined measurement incrementation frequency.

The determination of the specific operating conditions of the machine then advantageously comprises the comparison of this inter-edge value with a group of nominal inter-edge values.

Apart from the specific operating conditions determined previously, the phase-difference angle is, according to the invention, a function of the rotation speed of the machine.

According to additional characteristics of the method, each value of the level-switching delay, in units of time equal to the inverse of the measurement incrementation frequency, is preferably tabulated for each inter-edge value in a first table, just as a phase-difference value equal to the 180° complement of the phase-difference angle is preferentially tabulated for each inter-edge value in a second table.

At this stage, the basic method according to the invention advantageously comprises the following steps:
- the current incrementation frequency of a current programmable delay circuit associated with a current synchronisation signal is made equal to the measurement incrementation frequency;
- a current output line is associated with the current programmable delay circuit;
- the reference edge is identified from the difference value read in the second table;
- the current value of the delay read in the first table is loaded into the current programmable delay circuit;
- the current programmable delay circuit is configured so that the current output line effects a first transition from a high level to a low level, or a second transition from low level to a high level, when a current counter of the current programmable delay circuit reaches the current value;
- the current phase-difference signal is generated by means of the current output line.

Alternatively to the above steps, in a variant:
- the current incrementation frequency of a current programmable delay circuit associated with a current synchronisation signal is made equal to the measuring incrementation frequency;
- the reference edge is identified from the difference value read in the second table;
- the current value of the delay read in the first table is loaded into the current programmable delay circuit;
- a current interrupt associated with the current programmable delay circuit occurring each time the current value is reached is activated;
- the current counting frequency of a current programmable counter of a current programmable pulse width modulation module is made equal to the measurement incrementation frequency divided by twice the number of phases;
- a current output line is associated with the current programmable pulse width modulation module;
- a current period register and a current duty cycle register of the current programmable pulse width modulation module are loaded respectively with the inter-edge value and with half this inter-edge value;
- the current pulse width modulation module is configured so that the current output line undergoes an initial transition from a high level to a low level, then a first transition from a low level to a high level when the current programmable counter reaches a current intermediate value contained in the current duty cycle register, and finally a second transition from a high level to a low level when the current programmable counter reaches a current final value contained in the current period register at each triggering of the current interrupt;
- the current out-of-phase binary signal is generated by means of the current output line.

The invention also concerns a device for generating control signals for a polyphase rotary electrical machine comprising phase windings and rotor position sensors equal in number to the number of phases.

The device according to the invention is of the type comprising control lines intended to control the power supply to these windings, and a processing unit having inputs receiving synchronisation signals produced by the sensors and outputs transmitting signals out of phase with respect to the synchronisation signals.

This device is remarkable in that it also comprises switching circuits controlled by a switching signal transmitted by the processing unit and connecting the control lines either to the inputs or to the outputs, according to the rotation speed of the machine and/or the state of the processing unit.

More precisely, these switching circuits are advantageously analogue gates.

In a preferred embodiment of the invention, the processing unit preferably consists of a microprocessor or a microcontroller comprising:
- at least one central unit;
- at least one volatile memory and/or at least one non-volatile memory;
- at least one programmable counter measuring the rotation speed of the machine;
- programmable delay circuits at least equal in number to the number of phases;
- at least one input port receiving synchronisation signals produced by the sensors;
- at least a first output port transmitting signals out of phase with respect to the synchronisation signals;
- at least a second output port transmitting the switching signal.

Alternatively, in a variant, the processing unit preferentially consists of a microprocessor and a microcontroller comprising:
- at least one central unit;
- at least one volatile memory and/or at least one non-volatile memory;
- at least one programmable counter measuring the rotation speed of the machine;
- programmable delay circuits at least equal in number to the number of phases;
- programmable pulse width modulation modules at least equal in number to the number of phases;
- at least one input port receiving synchronisation signals produced by the sensors;
- at least a first output port transmitting signals out of phase with respect to the synchronisation signals;
- at least a second output port transmitting the switching signal.

In each embodiment, the non-volatile memory advantageously contains a first table associating time offsets of the out-of-phase signals loaded into the programmable delay circuits with values representing the rotation speed produced by the programmable counter.

This non-volatile memory also advantageously contains a second table associating the 180° complement of the phase differences of the out-of-phase signals with the values representing the rotation speed produced by the programmable counter.

Obviously advantage is taken of the fact that the memories of the processing unit preferably contain a program implementing the method according to the invention that was disclosed in outline above.

As goes without saying, the invention also concerns the sequences of instructions executable by the device described briefly above implementing the method according to the invention.

These few essential specifications will have made obvious to a person skilled in the art the advantages afforded by the method and device for generating control signals for a polyphase rotary electrical machine according to the invention compared with the prior art.

The detailed specifications of the invention are given in the following description in relation to the accompanying drawings. It should be noted that these drawings have no other purpose than to illustrate the text of the description and in no way constitute a limitation to the scope of the invention.

DESCRIPTION OF PREFERRED
EMBODIMENTS OF THE INVENTION

In the method of generating out-of-phase signals that is the object of the aforementioned conjoint application, the phase difference is created by time delays introduced by delay circuits, correctly programmed, from mutual references between the input synchronisation signals.

This principle routinely involves a delay in the appearance of the reconstructed signals with respect to the input signal during a transient phase corresponding to the establishment of the first period of each of the latter.

Figure 1:
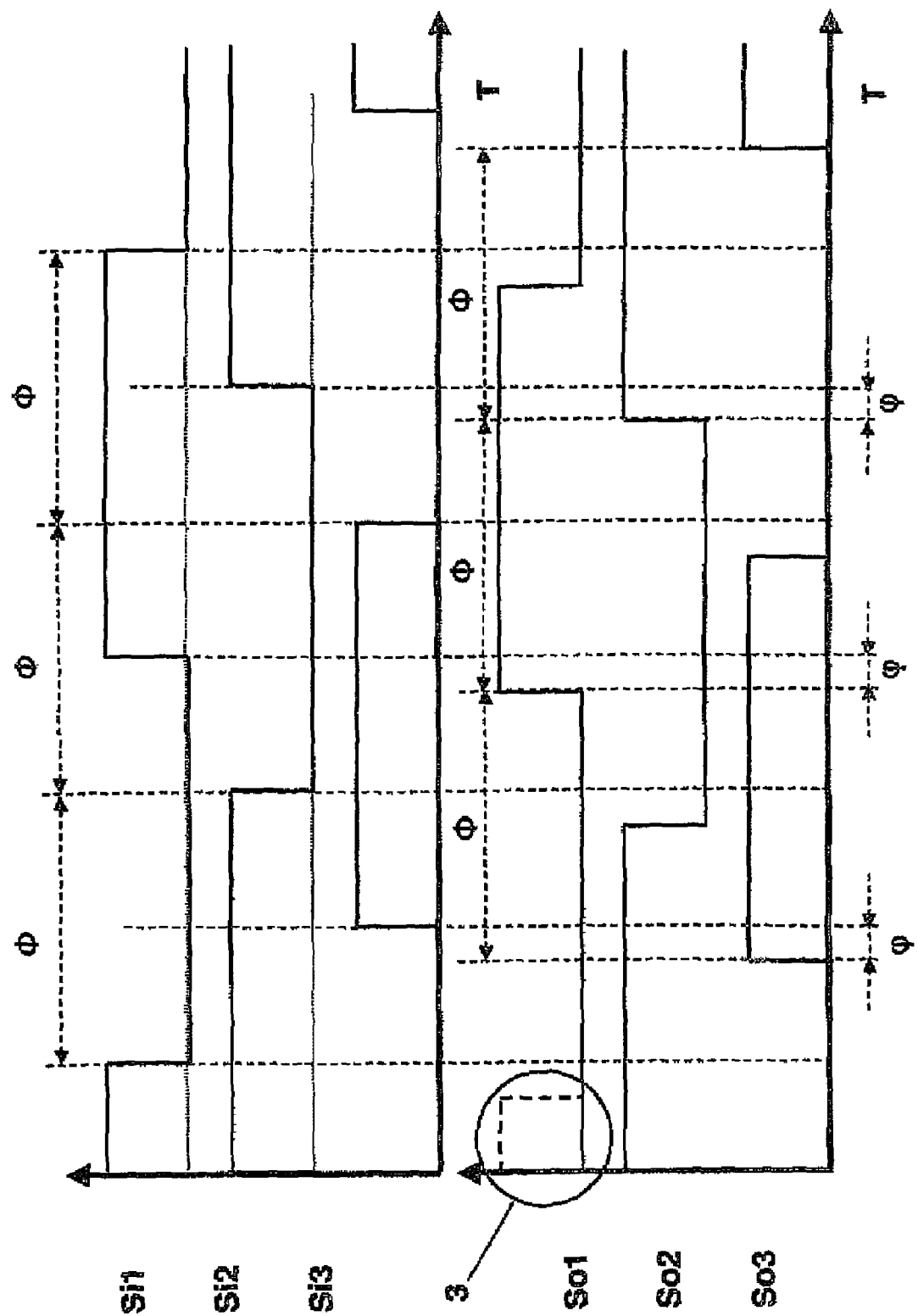
FIG. 1 shows the phase of appearance of the synchronisation signals issuing from the sensors.
Figure 10:
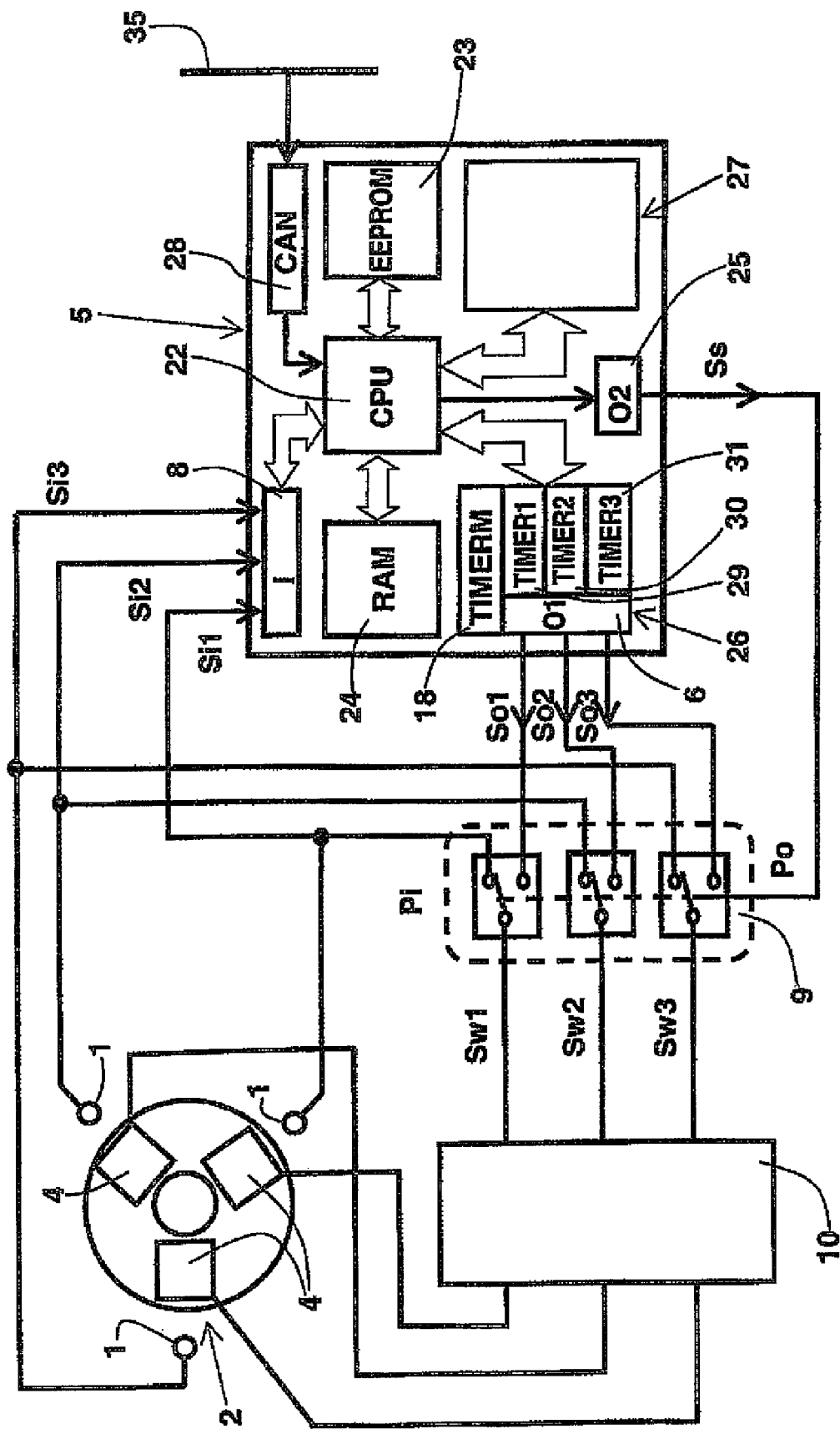
FIG. 10 is the outline diagram of a preferred embodiment of the device according to the invention using solely counters and programmable delay circuits.
Figure 11:
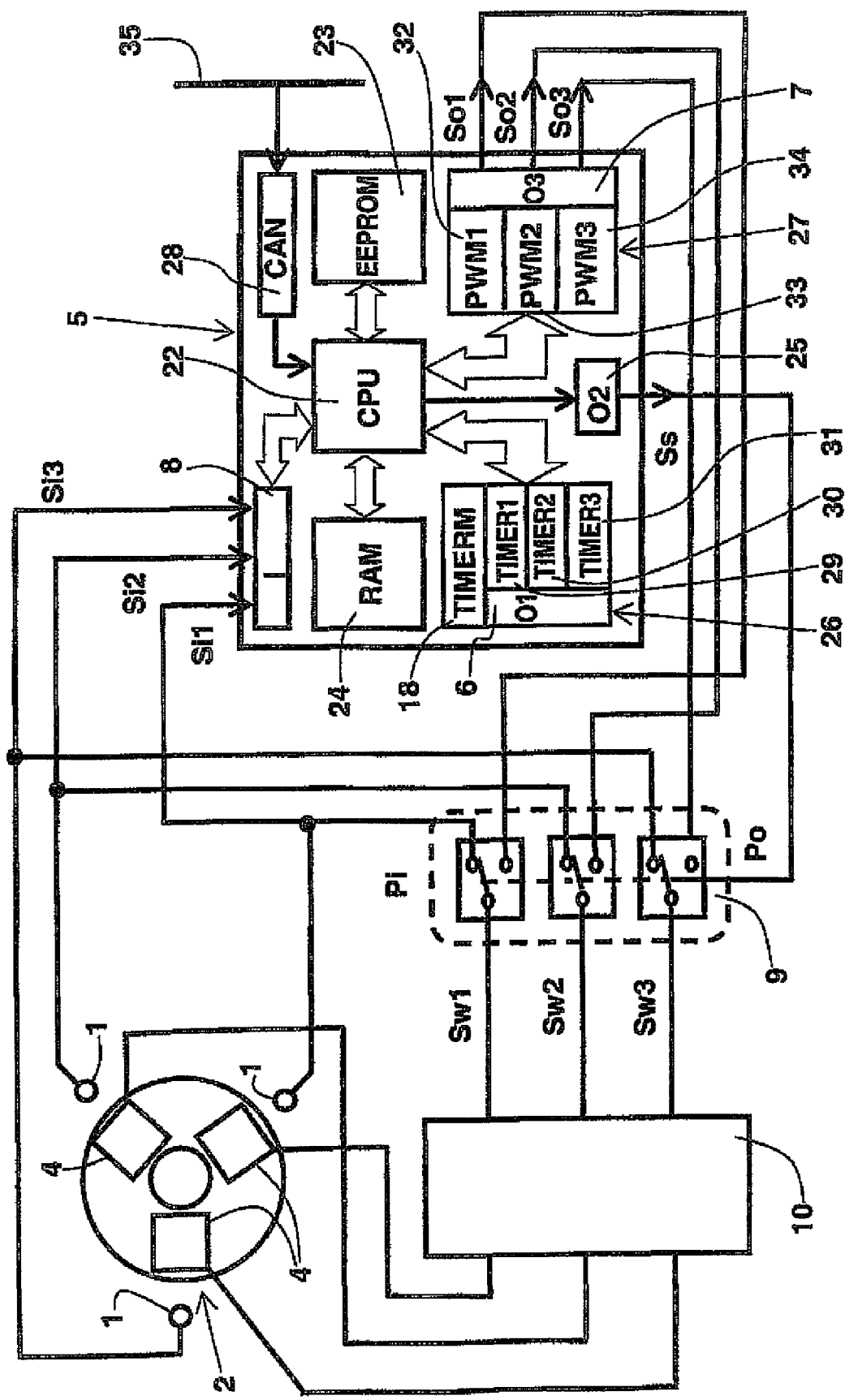
FIG. 11 is the outline diagram of a preferred variant embodiment of the device according to the invention using programmable pulse width modulation modules.

FIG. 1 shows the synchronization signals Si1, Si2, Si3 issuing from rotor position sensors 1 of a three-phase machine 2 depicted schematically in FIGS. 10 and 11.

The signals Si1, Si2, Si3 are binary signals with a duty cycle ratio 0.5 and which have between them a nominal phase difference Φ, here equal to 120°, the machine having three phases.

The general method of generating out-of-phase signals used in this application reconstructs signals So1, So2, So3 having between them in continuous operation the same nominal phase difference Φ but which have a phase-difference angle φ with respect to the incoming signals Si1, Si2, Si3.

During the transient phase, parts of the synchronisation signals Si1, Si2, Si3 may not be reconstructed, such as the portion 3 of the output signal So1 corresponding to the input signal Si1 depicted in FIG. 1.

However, the control of an electrical machine 2 requires the immediate reconstruction of the control signals Sw1, Sw2, Sw3 of phase windings 4, each defining a phase of the electrical machine 2, as soon as the input signals Si1, Si2, Si3 supplied by the position sensors 1 appear.

The solution adopted for resolving this problem consists of making the control signals Sw1, Sw2, Sw3 of the machine identical to the synchronisation signals Si1, Si2, Si3 during the transient phase of establishing the out-of-phase signals So1, So2, So3.

To do this, according to a first method, the microcontroller 5 implementing the phase-offsetting method reconfigures the lines of its output port 6, 7 as conventional outputs (high or low level digital outputs) and copies the logic levels Si1, Si2, Si3 present on the lines of its input port 8 connected to the sensors as soon as they appear, and up to a first minimum rotation speed Vmin1 of the machine 2.

Beyond this speed Vmin1, the algorithms for reconstructing the edges of the out-of-phase signals So1, So2, So3 from the edges of the synchronisation signals Si1, Si2, Si3 are activated.

In order to limit the jitter due to the measurement of the period of the input signals Si1, Si2, Si3 the copying of the signals is also reactivated as soon as the rotation speed exceeds a first maximum speed Vmax1.

Figure 2:
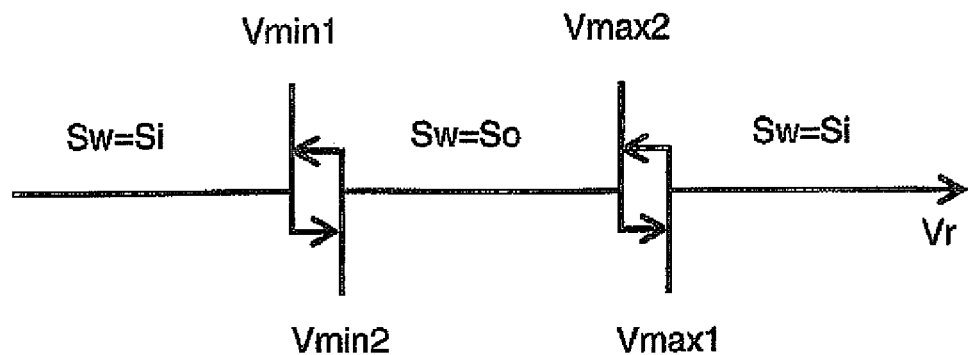
FIG. 2 shows the activation interval of the out-of-phase signals.

As shown by FIG. 2, hysteresis cycles are used at the boundaries of the specific operating domains that consist of starting and operating at high speed in order to prevent oscillations around the first minimum and maximum speeds Vmin1, Vmax1.

When the rotation speed increases from zero, the copying of the signals is maintained up to a second minimum speed Vmin2, slightly higher than the first minimum speed Vmin1: likewise, when the rotation speed decreases from a high value, the copying continues as far as a second maximum speed Vmax2, slightly lower than the first maximum speed Vmax1.

According to a second method, the control signals Sw1, Sw2, Sw3 are made identical to the signals Si1, Si2, Si3 issuing from the sensors 1 by means of an equivalent number of switching circuits 9 allowing the synchronised switching of the signals.

Figure 3:
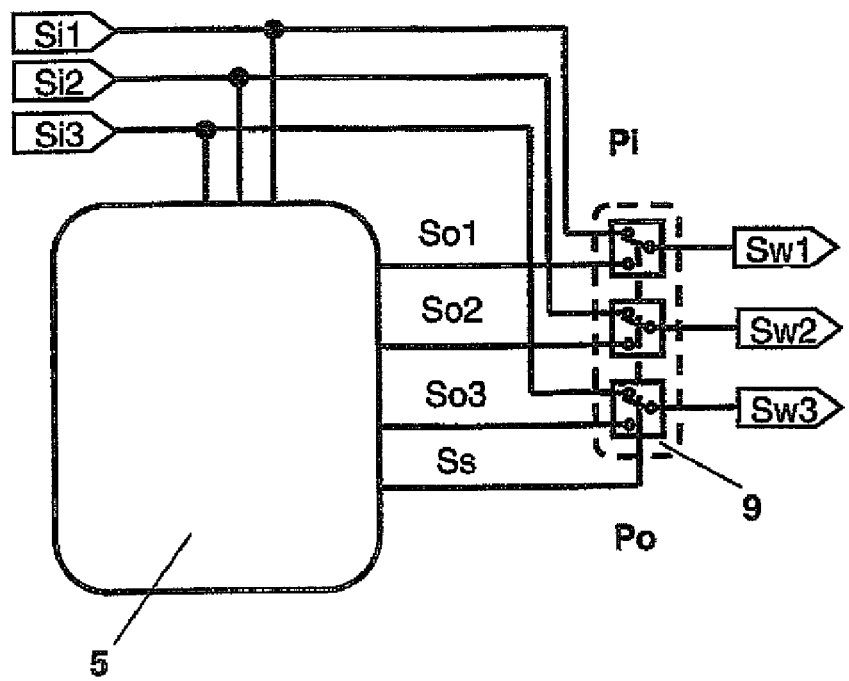
FIG. 3 shows the principle of the switching of the synchronisation signals or of the out-of-phase signals to the control signals.

FIG. 3 illustrates this second method. The use of the external switches 9 allows the switching either of the synchronisation signals Si1, Si2 and Si3 or of the out-of-phase signals So1, So2 and So3 to the power supply 10 according to the specific operating conditions of the machine 2.

The switching of the switching circuits 9 from one position Pi, Po to another is controlled by a switching signal Ss transmitted by the computer according to the result of a comparison between a measurement of the rotation speed and set values.

One advantage of this second method compared with the first is the security of functioning afforded by the switching circuits 9 should the system go into a degraded operating mode, for example when the microcontroller 5 is stopped.

This is because, if the position Pi, where the control signals Sw1, Sw2, Sw3 are identical to the synchronisation signals Si1, Si2, Si3 is considered to be an initial position, or default position, it is possible to imagine a protection strategy for forcing this position in the event of degradation of the functioning of the microcontroller 5.

Analogue gates 9, such as those of a multiplexor circuit, guarantee that, in this initial or default position Pi, the synchronisation signals Si1, Si2, Si3 issuing from the position sensors 1 control the power supply 10 to the machine 2 without modification.

The two methods disclosed above are applicable to the two solutions of offsetting by software proposed in the conjoint application "Method and device for generating out-of-phase signals and use thereof", to which reference can be made.

In the solutions for software regeneration of the offset signals, the set value for the angle φ is injected into the algorithm by the control modules of the application.

However, the control of the offset value by an application module external to the offsetting function involves the use of an intermediate calculation for evaluating the values corresponding to the delay to be introduced, and routinely results in an overloading of the central unit CPU of the microcontroller 5 used.

The use of these solutions in the control loop of a polyphase rotary electrical machine 2 therefore involves the integration of the variation law for the phase-difference angle φ according to the speed in the offsetting module and the optimisation of the calculations of the phase differences to be introduced.

The way that this variation law is integrated will be better understood with reference to FIGS. 4 to 9.

Figure 4:
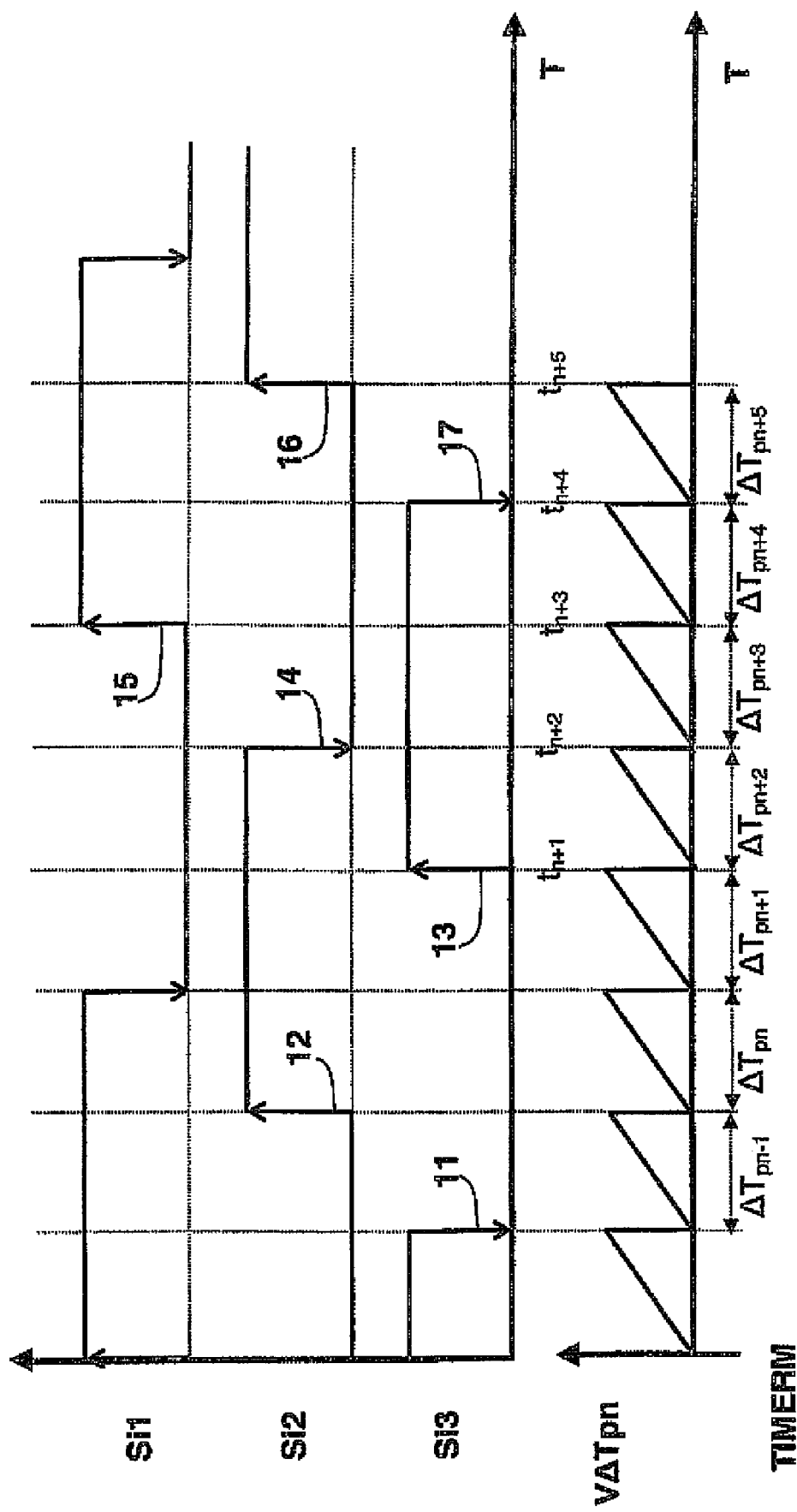
FIG. 4 illustrates the principle of the measurement of the speed of the machine by means of a programmable measuring delay circuit.

Taking account of the fact that, for a machine 2 with N phases, the sensors 1 for the position of the rotor are N in number and generate synchronisation signals Si1, Si2, Si3 having a duty cycle ratio of 0.5 and out of phase with each other by a nominal phase angle φ=360/N, it suffices to measure an interval of time ΔTpn between two successive edges, falling and then rising 11, 12; 14, 15; 17, 16, or rising and then falling 13, 14, as shown in FIG. 4, in order to measure the rotation period, that is to say the inverse of the rotation speed Vr.

To do this, a programmable measuring delay circuit TIMERM, 18 is used, the measurement incrementation frequency FTIMERM of which is predetermined. The value in units of time of the timer of the interval of time ΔTpn, that is to say the result VΔTpn of the counting by the TIMERM, is then:

$$V\Delta Tpn = \Delta Tpn * FTIMERM$$

The period ΔTtotal of the synchronisation signals Si1, Si2, Si3 is therefore at time tn:

$$\Delta Ttotal = Np * \Delta Tpn$$

or, in the unit of time of the timer TIMERM:

$$V\Delta Ttotal = Np * V\Delta Tpn$$

Np being the number of edges per electrical period of the signals Si1, Si2, Si3, that is to say Np=2*N.

As a result the inter-edge value VΔTpn is related to the rotation speed Vr (in revolutions per minute) by the following equation:

$$V\Delta Tpn = 60 * FTIMERM / (Np * Vr)$$

Integrating the variation law for the phase-difference angle φ according to the speed Vr in the application therefore amounts to integrating a law Lv associating a phase difference φ with each inter-edge value VΔTpn.

The conjoint patent application "Method and arrangement for generating out-of-phase signals and use thereof" discloses in detail the way of reconstructing the edges of the out-of-phase signals So1, So2, So3 from the reference edges of the synchronisation signals Si1, Si2, Si3.

The value VΔT1 of the level switching delay ΔT1 to be introduced with respect to a reference edge is given by the following expression:

$$V\Delta T1 = V\Delta Tpn * ((\phi'' * Np)/360)$$

where:
φ"=φ'+Δφref
φ' 180−φ
φ is the control phase angle expressed in degrees;

Δφref is the phase difference φ0−φr, expressed in degrees, between an initial edge of initial phase angle φ0 of the current synchronisation signal and the reference edge of reference phase angle φr of a reference synchronisation signal chosen from the synchronisation signals Si1, Si2, Si3.

For a three-phase machine, the values of Δφref are given in the following tables Ia and Ib:

TABLE Ia

| | φ' | | |
|---|---|---|---|
| | 0° ≦ φ' < 30° | 30° ≦ φ' < 90° | 90° ≦ φ' < 150° |
| Δφref | +60 | 0 | −60 |

TABLE Ib

| | φ' | | | |
|---|---|---|---|---|
| | 150° ≦ φ' < 210° | 210° ≦ φ' < 270° | 270° ≦ φ' < 330° | 330° ≦ φ' < 360° |
| Δφref | −120 | −180 | −240 | −300 |

Figure 5:
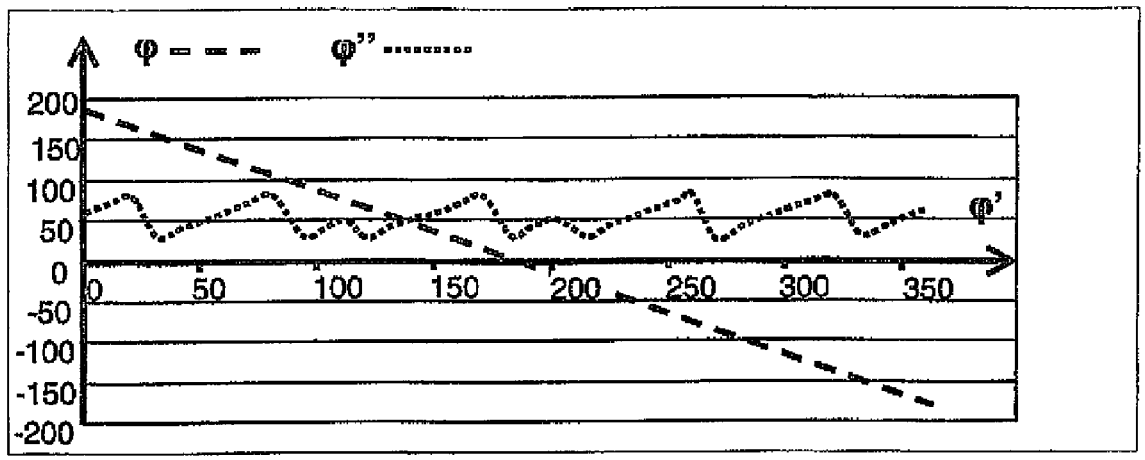
FIG. 5 depicts the variations in the phase-difference angle compared with the synchronisation signals, and the variations in the phase offset with respect to a reference edge according to the 180° complement of the phase-difference angle.

FIG. 5 shows the variations in φ and φ" as a function of φ'. When φ' varies from 0 to 360°, the phase-difference angle φ varies from −180° to +180°, thus covering the entire range of possible phase differences, but the values of φ" acting in the expression giving the value VΔT1 remain between 30° and 90°, thus minimising the level-switching delay ΔT1.

According to the method of the invention, the variation law for the phase-difference angle φ as a function of the rotation speed Vr is shown by a first table 19 with two columns, or vectors. The first column contains the values of VΔTpn and the second column the corresponding values of VΔT1.

The values of the two vectors are chosen so as to have the best compromise between a fine and precise control (a high number of points) and an acceptable calculation time for avoiding an overload of the central unit CPU of the microcontroller used 5 (a lower number of points). A linear interpolation is advantageously used for refining the calculations.

Figure 6:
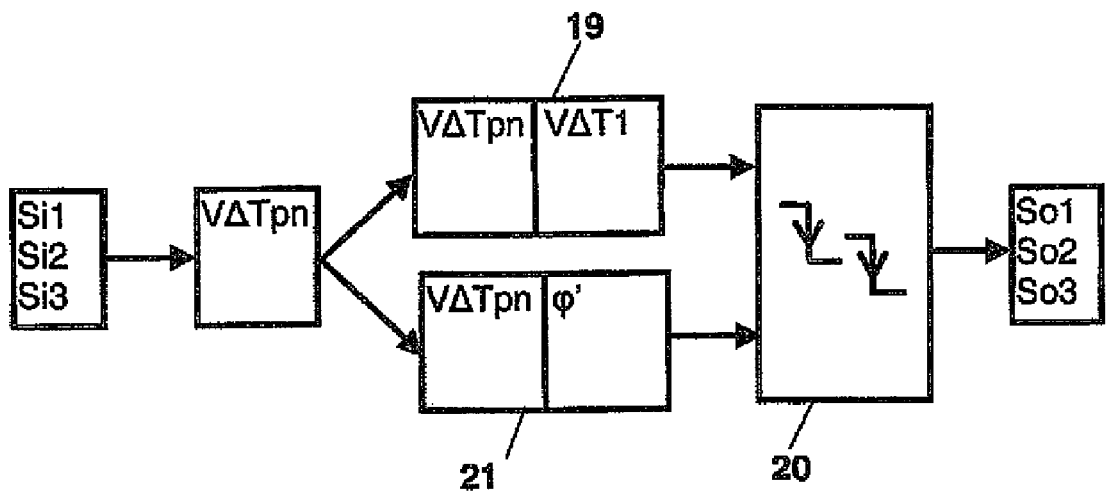
FIG. 6 illustrates schematically the use of tabulations at the input of the offset function.

As shown schematically in FIG. 6, the offsetting function 20 needs, in addition to the value VΔT1 of the level-switching delay ΔT1 the offset value φ' for identifying the reference edge as from which the value VΔT1 will be loaded into the current programmable delay circuit TIMER1, TIMER2, TIMER3 that creates delay.

This information is determined by virtue of a second tabulation 21 parallel to the first 19. In this case, the indexing information will always be the value VΔTpn measured and the value sought will be the corresponding angle φ'.

In practice, the integration of the control law over a limited range makes it possible to dispense with the second tabulation 21 since in this case Δφref keeps a constant value that can simply be given in a static fashion, as shown by the following example embodiment.

Figure 7:
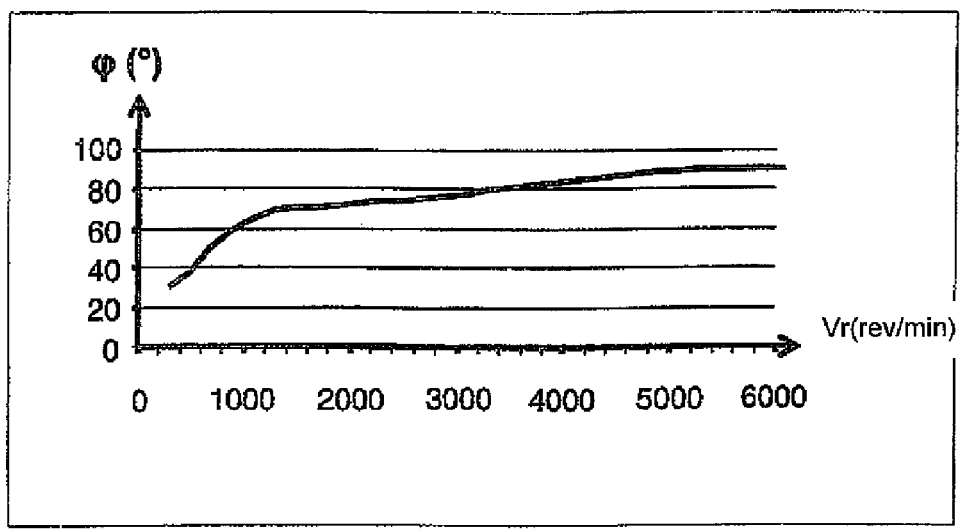
FIG. 7 depicts an example of a variation law for the phase-difference angle according to the rotation speed.

The law φ=F(Vr) of variation of the phase-difference angle φ as a function of the speed of a three-phase rotary electrical machine 2 is shown in FIG. 7.

As from a speed of 200 rev/min, an advance φ of 30° is applied in order to tend towards 90° of offset around 6000 rev/min.

In this interval of phase-difference values:
Δφref keeps a constant zero value (the reference edge is taken on the rising edge);

$-\phi'' = \phi'$ $V\Delta T1 = V\Delta Tpn * \phi'/60$

Figure 8:
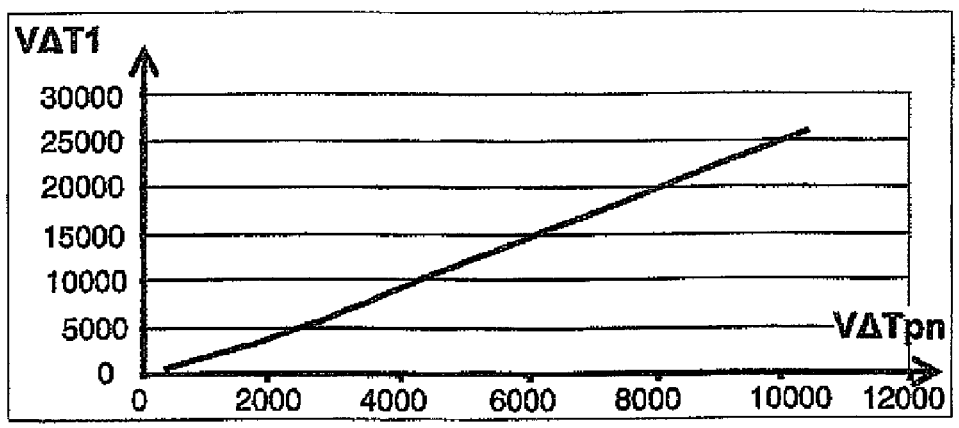
FIG. 8 depicts graphically an example of tabulation of the value of the level switching delay according to the inter-edge value.

The conversion of the speed in inter-edge values V∆Tpn by the programmable measuring delay circuit TIMERM, 18 of the inter-edge period ∆Tpn measured on the position sensors of the machine 2 leads to the variation law for the level-switching delay V∆T1 shown in FIG. 8.

Figure 9:
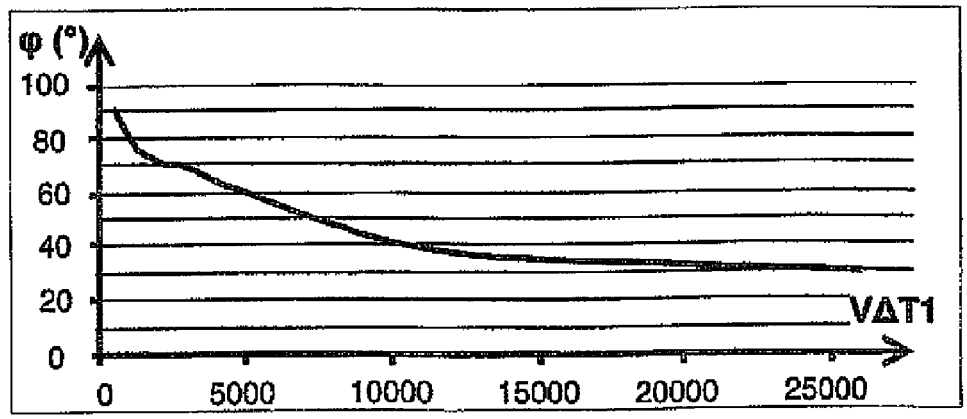
FIG. 9 depicts graphically the variations in the phase-difference angle according to the value of the level switching delay.

FIG. 9 shows the variations in the real phase difference φ that results from this.

The method of integrating the variation law for the phase-difference angle φ as a function of the rotation speed Vr is applicable to the basic method of generating out-of-phase signals, and to its variant, disclosed in the conjoint patent application, that is to say the regeneration of the signals and the offset are effected by programmable counters TIMERM, TIMER1, TIMER2, TIMER3, or the regeneration of the signals is performed by programmable pulse width modulation modules PWM1, PWM2, PWM3 and the offset by programmable counters TIMERM, TIMER1, TIMER2, TIMER3.

FIGS. 10 and 11 show the general architecture of the device 5, 9 adapted to the implementation of the method of generating control signals Sw1, Sw2, Sw3 according to the invention.

The microcontroller 5 used is preferably a 16-bit microcontroller of the MC9S12DG128 type manufactured by Motorola, which comprises:

- a central processing unit 22, where the internal clock frequency Fbus of the internal bus is preferably 20 MHz;
- a non-volatile memory 23 of the "flash" type, preferably 128 kilobytes;
- a RAM memory 24, preferably having a capacity of 8 kilobytes (RAM is the English acronym for "Random Access Memory", that is to say "Random Access Memory");
- I/O port 5, 6, 7, 8, 25, (I/O designates inputs/outputs, input/output in English);
- an ECT peripheral 26 (ECT is the English acronym for "Enhanced Capture Timer", that is to say "Enhanced Capture Timer");
- a PWM peripheral 27 (PWM is the English acronym for "Pulse Width Modulation", that is to say "Pulse Width Modulation");
- a CAN interface 28 (CAN is the English acronym for "Controller Area Network", that is to say "Controller Area Network");
- a JTAG interface (JTAG is the English acronym for "Joint Test Action Group", that is to say "Joint Test Action Group") for programming and debugging according to IEEE1149.1.

Through a dedicated output line 25, the microcontroller 5 controls Ss analogue gates 9 preferably consisting of a multiplexer/demultiplexer of the 74HC4053 type.

The ECT module 26 comprises a programmable counter 18 intended to measure the rotation speed Vr and programmable delay circuits 29, 30, 31 intended to generate the out-of-phase signals So1, So2, So3 in a first preferred embodiment shown in FIG. 10.

Alternatively, as shown in FIG. 11, the out-of-phase signals So1, So2, So3 are reconstructed by programmable pulse width modulation modules 32, 33, 34 of the PWM peripheral 27 instead of being reconstructed by the programmable delay circuits 29, 30, 31.

The set speed values of the machine are passed to the device 5, 9 for generating control signals Sw1, Sw2, Sw3 from an onboard bus of the CAN type 35 via the dedicated interface 28.

The implementation of the method according to the invention on a particular type of microcontroller 5, limiting itself to the generation of three control signals Sw1, Sw2, Sw3 for a three-phase machine 2, is given only by way of example.

A person skilled in the art will without difficulty apply the algorithms described to other programmable components such as microprocessors associated with memories, or FPGAs (FPGA is the English acronym for "Field Programmable Gate Array" that is to say "Field Programmable Gate Array") for any number of phases.

As goes without saying, the invention is therefore not limited solely to the preferential embodiments described above. On the contrary it embraces all possible variant embodiments within the limit of the object of the following claims.

The invention claimed is:

1. A method for generating control signals (Sw1, Sw2, Sw3) for a polyphase rotary electrical machine (2) comprising phase windings (4) each defining a phase of said electrical machine and rotor position sensors (1) for determining angular position of a rotor of said electrical machine such that a number of said sensors equals to the number of said phases, said control signals (Sw1, Sw2, Sw3) controlling a power supply (10) to said windings (4), said method comprising the steps of:
   generating synchronization signals (Si1, Si2, Si3) produced by said sensors (1);
   forming said control signals (Sw1, Sw2, Sw3) by signals (So1, So2, So3) shifted in phase by means of a processing unit (5) by a phase-difference angle (φ) continuously variable with respect to said synchronization signals (Si1, Si2, Si3), said processing unit (5) comprising inputs (8) receiving said synchronization signals (Si1, Si2, Si3) and outputs (6, 7) transmitting said out-of-phase signals (So1, So2, So3);
   said synchronization signals (Si1, Si2, Si3) being binary signals having synchronization edges (11-17);
   generating rising and falling edges of said out-of-phase signals (So1, So2, So3) after a level-switching delay (∆T1) being a function at least of said phase-difference angle (φ) from at least one reference edge chosen from said synchronization edges such that said delay (∆T1) being minimum.

2. A method for generating control signals (Sw1, Sw2, Sw3) for a polyphase rotary electrical machine (2) comprising windings (4) each defining a phase of said electrical machine and rotor position sensors (1) for determining angular position of a rotor of said electrical machine such that a number of said sensors equals to the number of said phases, said control signals (Sw1, Sw2, Sw3) controlling a power supply (10) to said windings (4), said method comprising the steps of:
   generating synchronization signals (Si1, Si2, Si3) produced by said sensors (1);
   forming said control signals (Sw1, Sw2, Sw3) by signals (So1, So2, So3) shifted in phase by means of a processing unit (5) by a phase-difference angle (φ) continuously variable with respect to said synchronization signals (Si1, Si2, Si3) said processing unit (5) comprising in puts (8) receiving said synchronization signals (Si1, Si2, Si3) and outputs (6, 7) transmitting said out-of-phase signals (So1, So2, So3);
   said synchronization signals (Si1, Si2, Si3) being binary signals having synchronization edges (11-17); and
   generating rising and falling edges of said out-of-phase signals (So1, So2, So3) after a level-switching delay (∆T1) being a function at least of said phase-difference angle (φ) from at least one reference edge chosen from said synchronization edges such that said delay (∆T1) being minimum;

said control signals (Sw1, Sw2, Sw3) being identical to said synchronization signals (Si1, Si2, Si3) when a rotation speed (Vr) of said machine (2) being less than a first minimum speed (Vmin1) or higher than a first maximum speed (Vmax1).

3. The method according to claim 2, wherein said specific operating conditions comprise the case where said rotation speed (Vr):
increases and remains below a second minimum speed (Vmin2) higher than said first minimum speed (Vmin1);
decreases and remains higher than a second maximum speed (Vmax2) lower than said first maximum speed (Vmin1), said second maximum speed (Vmax2) being higher than said second minimum speed (Vmin2).

4. The method according to claim 2, wherein said specific operating conditions comprise the case where said processing unit (5) is stopped.

5. The method according to claim 2, wherein, under said specific operating conditions, said processing unit (5) copies the logic levels of said inputs (8) on said outputs (6, 7).

6. The method according to claim 2, wherein, under said specific operating conditions, said processing unit (5) controls the switching of said control signals (Sw1, Sw2, Sw3) onto said inputs (8).

7. The method according to claim 2, wherein, said synchronization signals (Si1, Si2, Si3) having a duty cycle ratio equal to 0.5 and being out of phase with each other by a nominal phase-difference angle (Φ) in degrees equal to 360° divided by said number of phases, an interval of time (ΔTpn) between two of said successive synchronization edges (11-17) is measured, one being rising and the other falling.

8. The method according to claim 7, wherein an inter-edge value (VΔTpn) of said interval of time (ΔTpn) results from a counting by means of a programmable measuring delay circuit (TIMERM) associated with said synchronization signals (Si1, Si2, Si3) having a predetermined measurement incrementation frequency (FTIMERM).

9. The method according to claim 8, wherein the determination of said specific operating conditions comprises the comparison of said inter-edge value (VΔTpn) with a group of nominal inter-edge values.

10. The method according to claim 8, wherein, outside said specific operating conditions, said phase-difference angle (Φ) is a function of said rotation speed (Vr).

11. The method according to claim 10, wherein each value (VΔT1) of said delay (ΔT1), in units of time equal to the inverse of said measurement incrementation frequency, is tabulated for each inter-edge value (VΔTpn) in a first table (19).

12. The method according to claim 11, wherein an offset value (φ') equal to the 180° complement of said phase-difference angle (φ) is tabulated for each inter-edge value (VΔTpn) in a second table (21).

13. The method according to claim 11, further comprising the following steps:
making the current incrementation frequency (FTIMER1) of a current programmable delay circuit (TIMER1) associated with a current synchronisation signal (Si1) equal to said measurement incrementation frequency (FTIMERM);
associating a current output line with said current programmable delay circuit (TIMER1);
identifying the reference edge from the difference value (φ') read in said second table (21);
loading the current value (VΔT1) of the delay read in said first table (19) into the current programmable delay circuit (TIMER1);
configuring said current programmable delay circuit (TIMER1) so that said current output line effects a first transition from a high level to a low level, or a second transition from low level to a high level, when a current counter of the said current programmable delay (TIMER1) circuit reaches said current value (VΔT1); and
generating the current phase-difference signal (So1) by means of the current output line.

14. The method according to claim 11, further comprising the following steps:
making the current incrementation frequency (FTIMER1) of current programmable delay circuit (TIMER1) associated with said current synchronization signal (Si1) equal to said measurement incrementation frequency (FTIMERM);
identifying said reference edge from said difference value (φ') read in said second table;
loading the current value (VΔT1) of said delay (ΔT1) read in said first table (19) into said current programmable delay circuit (TIMER1);
activating a current interrupt associated with said current programmable delay circuit (TIMER1) occurring each time said current value (VΔT1) is reached;
making the current counting frequency of a current programmable counter of a current programmable pulse width modulation module (PWM1) equal to said measurement incrementation frequency (FTIMERM) divided by twice the number of phases;
associating a current output line with said current programmable pulse width modulation module (PWM1);
loading a current period register and a current duty cycle register of said current programmable pulse width modulation (PWM1) module respectively with said inter-edge value (VΔTpn) and with half this inter-edge value (VΔTpm);
configuring said current pulse width modulation module (PWM1) so that said current output line undergoes an initial transition from a high level to a low level, then a first transition from a low level to a high level when said current programmable counter reaches a current intermediate value contained in the current duty cycle register, and finally a second transition from a high level to a low level when said current programmable counter reaches a current final value contained in said current period register at each triggering of the said current interrupt; and
generating said current out-of-phase binary signal (So1) by means of said current output line.

15. A device (5, 9) for generating control signals (Sw1, Sw2, Sw3) for a polyphase rotary electrical machine (2) comprising phase windings (4) and rotor position sensors (1) for determining angular position of a rotor of said electrical machine such that a number of said sensors equals to the number of said phases, said device comprising:
control lines intended to control a power supply (10) to said windings (4);
a processing unit (5) having inputs (8) receiving synchronization signals (Si1, Si2, Si3) produced by said sensors (1), and outputs (6, 7) transmitting signals (So1, So2, So3) out of phase with respect to said synchronization signals (Si1, Si2, Si3); and
switching circuits (9) controlled by a switching signal (Ss) transmitted by said processing unit (5) and connecting said control lines to one of said inputs (8) and said outputs (6, 7) according to at least one of a rotation speed (Vr) of said machine (2) and the state of said processing unit (5).

16. The device (5, 9) according to claim 15, wherein said switching circuits (9) are analogue gates.

17. Sequences of instructions executable by the device (5, 9) according to claim 15 implementing a method of generating control signals (Sw1, Sw2, Sw3) for a polyphase rotary electrical machine (2) comprising phase windings (4) and rotor position sensors (1) for determining angular position of a rotor of said electrical machine such that a number of said sensors equals to the number of said phases;

said control signals (Sw1, Sw2, Sw3) controlling the power supply (10) to said phase windings (4) being formed by signals (So1, So2, So3) shifted in phase by means of a processing unit (5) by a phase-difference angle ($\phi$) continuously variable with respect to synchronization signals (Si1, Si2, Si3) produced by said rotor position sensors (1);

said processing unit (5) comprising inputs (8) receiving said synchronization signals (Si1, Si2, Si3) and outputs (6, 7) transmitting said out-of-phase signals (So1, So2, So3);

said synchronization signals (Si1, Si2, Si3) being binary signals having synchronization edges (11-17);

the rising and falling edges of said out-of-phase signals (So1, So2, So3) being generated after a level-switching delay ($\Delta T1$) being a function at least of said phase-difference angle ($\phi$) from at least one reference edge chosen from said synchronization edges such that said delay ($\Delta T1$) being minimum.

18. A device (5, 9) for generating control signals (Sw1, Sw2, Sw3) of a polyphase rotary electrical machine (2) comprising phase windings (4) and rotor position sensors (1) for determining angular position of a rotor of said electrical machine such that a number of said sensors equals to the number of said phases, the device comprising:

control lines intended to control a power supply (10) to the said windings (4);

a processing unit (5) having inputs (8) receiving synchronization signals (Si1, Si2, Si3) produced by said sensors (1), and outputs (6, 7) transmitting signals (So1, So2, So3) out of phase with respect to said synchronization signals (Si1, Si2, Si3); and switching circuits (9) controlled by a switching signal (Ss) transmitted by said processing unit (5) and connecting said control lines either to one of said inputs (8) and said outputs (6, 7) according to at least one of a rotation speed (Vr) of said machine (2) and the state of said processing unit (5), said processing unit (5) comprising a microcontroller comprising:

at least one central unit (2);

at least one of volatile memory (24) and non-volatile memory (23);

at least one programmable counter (18) measuring said rotation speed (Vr) of said machine;

programmable delay circuits (29, 30, 31) at least equal in number to said number of phases;

at least one input port (8) receiving synchronization signals (Si1, Si2, Si3) produced by said rotor position sensors (1);

at least a first output port (6) transmitting signals (So1, So2, So3) out of phase with respect to said synchronization signals (Si1, Si2, Si3); and at least a second output port (25) transmitting said switching signal (Ss).

19. The device (5, 9) according to claim 18, wherein said microcontroller further comprising:

programmable pulse width modulation modules (32, 33, 34) at least equal in number to said number of phases.

20. The device (5, 9) according to claim 18, wherein said non-volatile memory (24) contains a first table (19) associating time offsets (V$\Delta$T1) of said out-of-phase signals (So1, So2, So3) loaded into said programmable delay circuits (29, 30, 31) with values (V$\Delta$Tpn) representing said rotation speed (Vr) and produced by said programmable counter (18).

21. The device (5, 9) according to claim 20, wherein said non-volatile memory (24) contains a second table (21) associating the 180° complement of the phase differences ($\phi$) of said out-of-phase signals (So1, So2, So3) with said values (V$\Delta$Tpn) representing said rotation speed (Vr) and produced by said programmable counter (18).

22. The device (5, 9) according to claim 18, wherein said memories (23, 24) contain a program implementing a method of generating control signals (Sw1, Sw2, Sw3) for a polyphase rotary electrical machine (2) comprising phase windings (4) and sensors (1) for the position of the rotor equal in number to the number of said phases, where said control signals (Sw1, Sw2, Sw3) controlling the power supply (10) to said windings (4) are formed by signals (So1, So2, So3) shifted in phase by means of a processing unit (5) by a phase-difference angle ($\phi$) continuously variable with respect to synchronization signals (Si1, Si2, Si3) produced by said sensors (1), said processing unit (5) comprising inputs (8) receiving said synchronization signals (Si1, Si2, Si3) and outputs (6, 7) transmitting said out-of-phase signals (So1, So2, So3), wherein said synchronization signals (Si1, Si2, Si3) are binary signals having synchronization edges (11-17) and wherein the rising and falling edges of said out-of-phase signals (So1, So2, So3) are generated after a level-switching delay ($\Delta T1$) that is a function at least of said phase-difference angle ($\phi$) from at least one reference edge chosen from said synchronization edges such that said delay ($\Delta T1$) is minimum.

* * * * *